United States Patent [19]

Denkin et al.

[11] 4,186,994
[45] Feb. 5, 1980

[54] ARRANGEMENT FOR COUPLING BETWEEN AN ELECTROOPTIC DEVICE AND AN OPTICAL FIBER

[75] Inventors: Nathan M. Denkin, Aberdeen; Peter K. Runge, Fair Haven, both of N.J.

[73] Assignee: Bell Telephone Laboratories, Incorporated, Murray Hill, N.J.

[21] Appl. No.: 898,926

[22] Filed: Apr. 21, 1978

[51] Int. Cl.$^2$ ............................................. G02B 5/14
[52] U.S. Cl. .................................. 350/96.17; 250/227; 350/96.20
[58] Field of Search .................... 250/227; 350/96.15, 350/96.17, 96.18, 96.20

[56] References Cited

U.S. PATENT DOCUMENTS

| | | | |
|---|---|---|---|
| 3,423,594 | 1/1969 | Galopin | 350/96.20 X |
| 3,628,036 | 12/1971 | Humphrey | 250/227 |
| 3,968,564 | 7/1976 | Springthorpe | 350/96.15 X |
| 4,030,811 | 6/1977 | Khoe et al. | 350/96.17 |
| 4,065,203 | 12/1977 | Goell et al. | 350/96.15 |
| 4,075,477 | 2/1978 | Hanson | 250/227 |
| 4,101,197 | 7/1978 | Kent et al. | 350/96.17 |
| 4,118,100 | 10/1978 | Goell et al. | 350/96.20 |
| 4,130,343 | 12/1978 | Miller et al. | 350/96.15 |

FOREIGN PATENT DOCUMENTS

| | | | |
|---|---|---|---|
| 980451 | 12/1975 | Canada | 350/96.17 |
| 2313688 | 12/1976 | France | 350/96.20 |

OTHER PUBLICATIONS

Cohen, "Power Coupling from GaAs Injection Lasers into Optical Fibers," *Bell Syst. Tech. Journal*, vol. 51, No. 3, Mar. 1972, pp. 573-594.

Crow et al., "GaAs Laser Array Source Package," *Optics Letters*, vol. 1, No. 1, Jul. 1977, pp. 40-42.

*Primary Examiner*—John K. Corbin
*Assistant Examiner*—John D. Lee
*Attorney, Agent, or Firm*—John K. Mullarney

[57] ABSTRACT

The invention relates to apparatus for precisely aligning an optical device, i.e., a light source or receptor, to an optical fiber. In one embodiment, the apparatus comprises a header (10) having a plateau (11) for mounting the device (15) and a trough (12) for positioning of the optical fiber (19). The depth (D) of the trough is precisely configured so that the alignment process is limited to adjustment in only one direction (L-L'). A second embodiment (30) allows for the hermetic enclosure of the optical device and adjacent section of optical fiber while providing the same alignment advantage.

7 Claims, 8 Drawing Figures

ARRANGEMENT FOR COUPLING BETWEEN AN ELECTROOPTIC DEVICE AND AN OPTICAL FIBER

TECHNICAL FIELD

This invention relates to optical transmission receivers or transmitters and, in particular, to apparatus for aligning an optical fiber to an electrooptic device such as a light source or receptor.

BACKGROUND OF THE INVENTION

The increasing development of optical fibers for communications purposes has created a need for a quick and inexpensive means of precisely aligning and coupling an optical fiber to a light emitter or detector. While a variety of such emitters or detectors are employed, the method of aligning and coupling is similar.

Semiconductor lasers, because of their compact size and high light output, are particularly well suited for use as emitters. The higher light output attainable extends the transmission range and reduces the number of optical amplifiers in the transmission path. The peak light-emitting area of the semiconductor laser, however, is not uniform. This area, while within the laser-emitting stripe, significantly varies among devices. Therefore, individual alignment of each laser and fiber is required to achieve low optical coupling loss. For similar reasons, individual alignment is also required for light-emitting diodes and photodiodes.

It is known (*Bell System Technical Journal*, March 1972, pages 573-594) to mount both the laser and fiber on separate holders and use micromanipulators to move the holders and thereby attain the desired alignment of laser and fiber. The optimum positioning is then secured by epoxy. The technique is time consuming and requires the use of precision fixturing.

The use of V-grooves on the orthogonal faces of a coupler block is disclosed by G. D. Khoe et al in U.S. Pat. No. 4,030,811, issued on June 21, 1977. This procedure requires precise initial placement of the laser on a cylindrical mounting rod. The laser position is then adjusted by sliding the rod in a V-groove disposed in a coupler block. Fabrication of the block is expensive and the laser mounting arrangement provides marginal thermal dissipation capacity due to the limited contact area between mounting rod and V-groove. This exiguous dissipation capacity substantially increases the likelihood of premature laser failure.

In U.S. Pat. No. 4,065,203 to Goell et al, issued Dec. 27, 1977, the use of a stepped header or mounting apparatus for a laser and optical fiber is disclosed. Both of these elements are located on different levels and with the aid of epoxy are aligned. As epoxy deteriorates under varying temperature and humidity conditions, this technique does not possess long term stability required in telecommunications applications.

SUMMARY OF THE INVENTION

The above-described prior art problems are solved, in accordance with one aspect of the invention, by mounting the device and optical fiber on a precisely formed stepped header. The improvement over the prior art resides in that the difference between the device and fiber mounting levels is precisely fabricated so that when the device and the fiber are placed on their respective mounting levels, the misalignment is only along one dimension. As a result, precise alignment is more rapidly achieved and maintained. Specifically, the time necessary to precisely align the device and fiber is reduced at least 50 percent. Moreover, as an epoxy or other material is not required to bring the two elements into alignment along a second direction, the precision positioning is not affected by temperature or humidity.

According to another aspect of the invention, the header can be modified to provide a hermetic laser-optic fiber junction.

It is an advantage of the invention that both header configurations can be readily molded within an optical fiber connector assembly. As a smooth surface finish is required for engaging surfaces of such assemblies, an embodiment of the header is provided with an integral tube for entrapping gases during the molding process. This technique is set forth in detail in copending application of L. Curtis, Ser. No. 837,398, filed Sept. 28, 1977, assigned to applicants' assignee.

In another embodiment of the invention, the header is advantageously employed to provide mounting means for the optical connector containing a light emitter or receptor.

All of the above embodiments are, of course, equally applicable to use with a myriad of optical sources or receptors.

DETAILED DESCRIPTION

Figure 1:
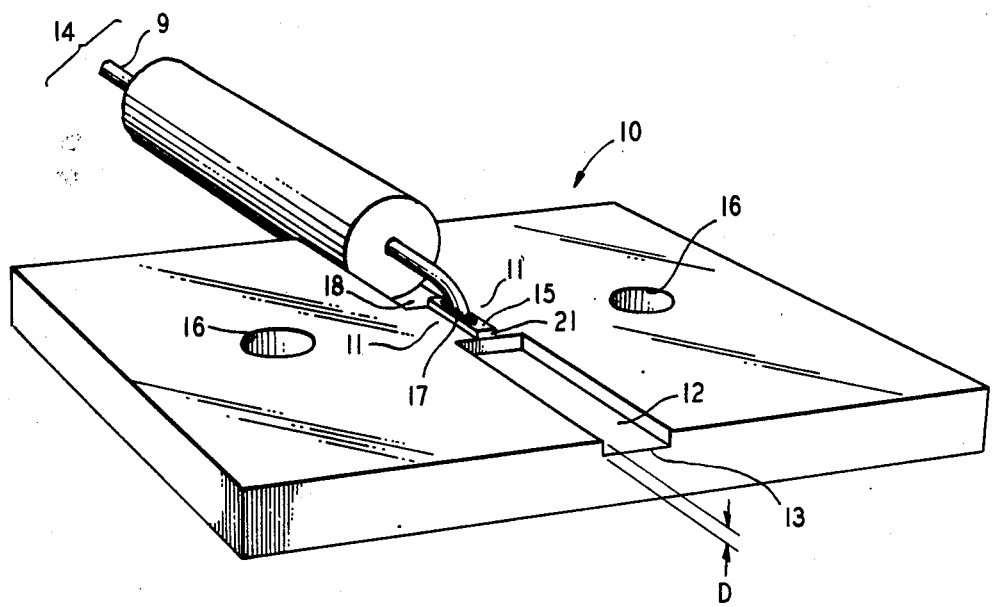
FIG. 1 shows an embodiment of a nonhermetic header with a semiconductor laser and attached electrical connections.
Figure 2:
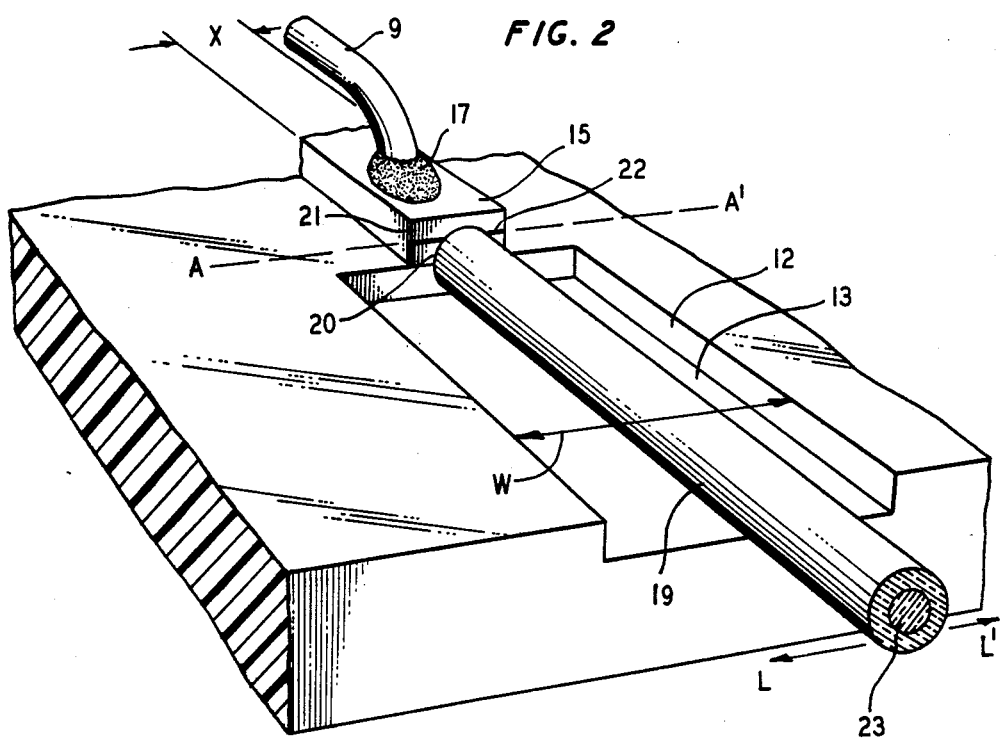
FIG. 2 illustrates the method of precisely aligning the optical fiber to the laser.
Figure 3:
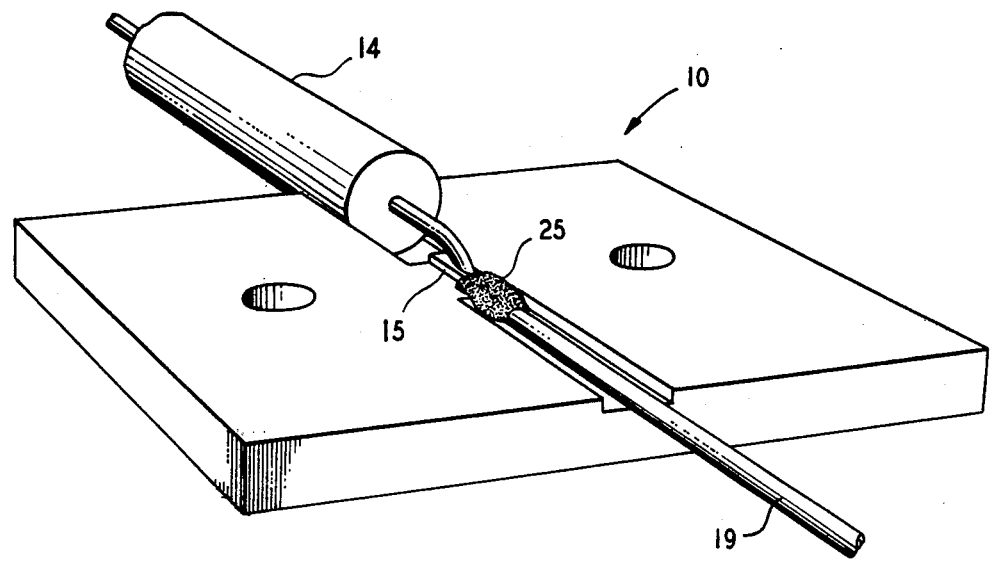
FIG. 3 shows an optical fiber precisely aligned and secured to the laser-header combination of FIG. 1.

Referring to the drawings, FIGS. 1, 2 and 3 show a nonhermetic metallic header for aligning and coupling an electrooptic device to an optical fiber in accordance with the present invention. The device 15, which can be either an optical source, such as a laser or an LED, or an optical detector, is permanently bonded on a plateau 11 by means such as soldering. Also provided on header 10 is a fiber receiving trough 12 disposed adjacent to the plateau 11. The trough has a flat bottom 13 and is configured to have a precise depth D to facilitate the alignment process to be discussed infra.

The header is also advantageously provided with mounting holes 16 as well as electrical feedthrough trough 18. Electrical feedthrough 14 is inserted into trough 18 and the inner wire 9 is permanently secured to device 15 by means of solder 17. The dimension or shape of electrical feedthrough trough need not be precise, as the function of the trough is merely to hold feedthrough 14 in an approximate position for soldering to device 15.

For purposes of illustration and discussion, the method of aligning and coupling a device such as a laser to the fiber is shown in detail in FIG. 2. The laser 15 with its inner wire 9 affixed, is activated. Optical fiber 19 is fully inserted until its mating end 20, or a portion thereof, is in contact with output face 21 of laser 15. To achieve optimum coupling, fiber 19 is moved transversely, as indicated by arrows L-L' across the output face 21 of laser 15 until maximum light output is measured at the opposite end 23 of fiber 15. While fiber 15 is in this optimum position, bonding agent 25, such as epoxy is dispensed over laser 15 and fiber 19 to retain the two in optimum alignment. After the bonding agent sets, fiber 19 can be cut to any desired length. It should be noted that if epoxy is used here it is only to hold the fiber in a position of optimum coupling, rather than as in the prior art to achieve optimum alignment itself. Therefore, temperature and humidity variations, which adversely affect the epoxy, will not affect the precision alignment.

As shown in FIG. 2, the depth D of fiber receiving trough 12 is precisely formed so that when fiber 19 is fully inserted the center of fiber 19, immediately adjacent to laser 15, lies in a plane of maximum light output from laser 15. This plane, (A-A'), parallel to the trough bottom, intersects the point of maximum light emission from laser 15. As a result, the alignment process is limited to adjustment of the fiber 19 in only one dimension (L-L'). Of course, the above-described alignment procedure could be performed by fixing the fiber in the trough and moving the laser across plateau 11. As noted above, the use of epoxy in this instance is only to hold the fiber in optimum position, rather than as in the prior art to achieve the optimum alignment itself.

It should also be understood that a further advantage of the present invention is that by providing a trough width W that is many times the width X of laser 15, the laser may be positioned over a range of locations along plateau 11 without adversely affecting coupling efficiency.

Figure 4:
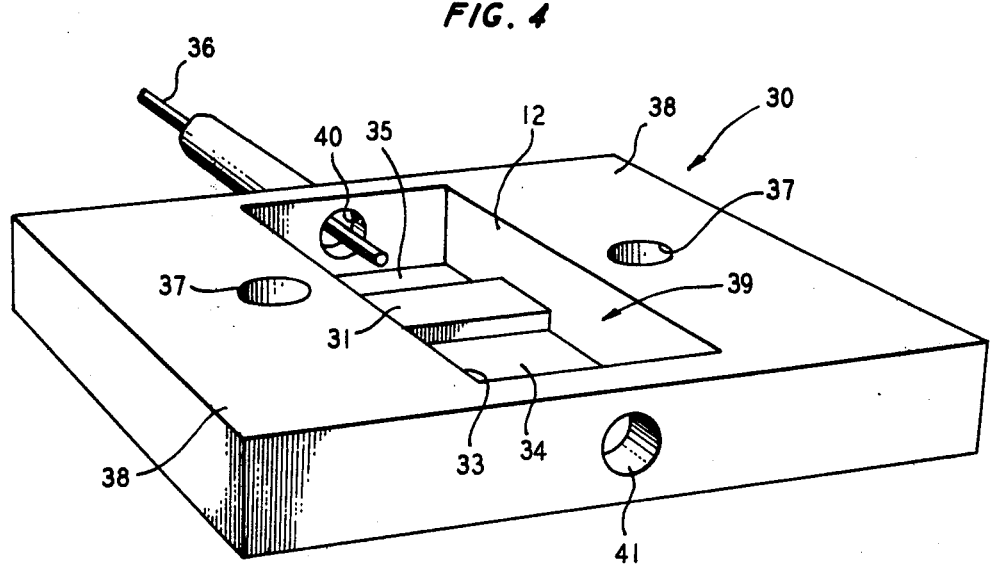
FIG. 4 depicts a hermetic header in accordance with the present invention.
Figure 5:
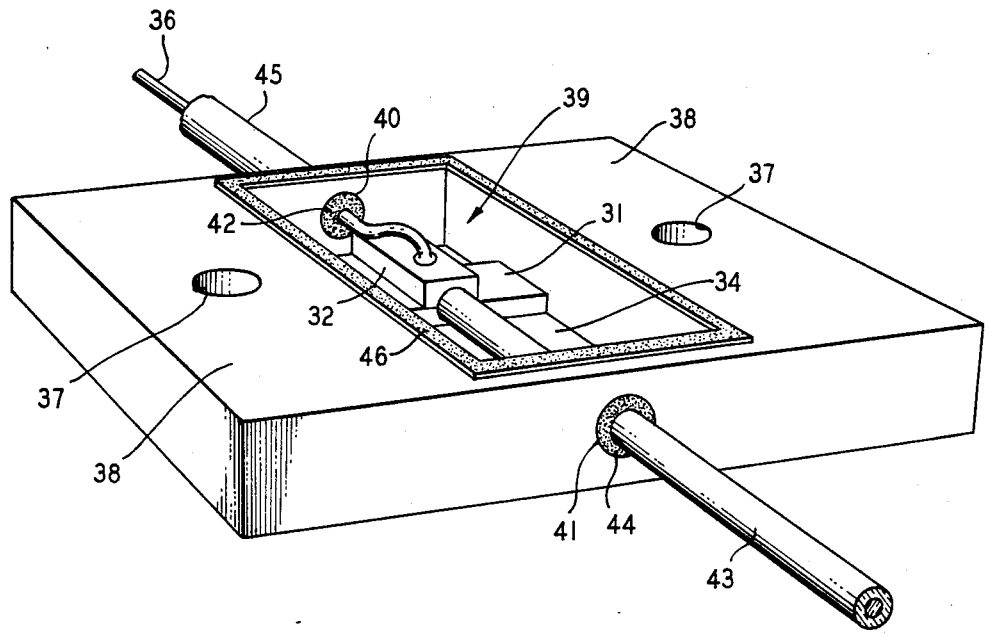
FIG. 5 shows the hermetic header and aligned laser and optical fiber.

A metallic hermetic header 30 having all advantages of the nonhermetic header 10 is shown in FIGS. 4 and 5. The hermetic header embodiment is provided with a well portion which includes a plateau 31 on which a laser 32 is mounted and a fiber receiving trough 33 with a flat bottom 34. In similar fashion, header 30 is also advantageously provided with both an electrical feedthrough trough 35, for electrical lead 36, and mounting holes 37. The dimensional requirements of fiber receiving trough 33 is identical to that of trough 12 described above.

Alignment of the fiber to the laser with the hermetic header is identical to the procedure described with regard to the nonhermetic embodiment. As the fiber 43 is flexible, the length of fiber within the well portion 39 of header 30 can be moved laterally to attain optimum coupling. A bonding agent is again used to permanently secure the fiber relative to the laser.

Access to the well portion of the header is provided by holes 41 and 40, dimensioned so as to accommodate an optical fiber and an electrical lead, respectively. Sealing of the holes can be accomplished by several techniques. As illustrated in FIG. 5, solder preform 44 is disposed between optical fiber 43 and the periphery of hole 41. With the application of heat, the preform will melt and seal the annulus surrounding fiber 43. In similar fashion, preform 42 seals hole 40 containing electrical lead 36. Another sealing technique is to coat both the insulation 45 of lead 36 and the circumference of fiber 43 with solder in the region adjacent to raised periphery 38. After fiber 43 and lead 36 are inserted through holes 41 and 40, respectively, the deposition of additional solder seals both openings.

Completion of the hermetic seal is accomplished by soldering or welding a metal plate, not shown, to each side of the raised periphery. This operation may be facilitated by the use of another solder preform 46 as shown in FIG. 5.

Both the hermetic and nonhermetic header may be molded within an optical connector plug, as for example the type disclosed in the copending application of P. K. Runge, Ser. No. 630,930, filed Nov. 11, 1975, assigned to the applicants' assignee, to provide an optical receiver or transmitter. During molding, entrapped gases tend to produce voids in the mating surfaces of the connector shell. These voids can cause misalignment of the connector halves and result in optical losses. To avoid this both headers can advantageously be provided with an integral tube which extends from the header and surrounds the optical fiber. During the molding operation, the tube retains entrapped gases in the mold, thereby eliminating the problem of voids on the mating surfaces of the finished connector.

Figure 6:
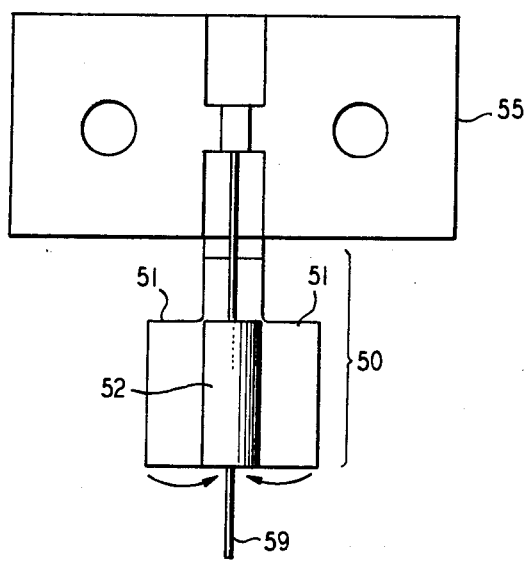
FIG. 6 shows an embodiment of the non-hermetic header with provisions for fabricating an integral tube to facilitate the molding of the header and optical fiber within a plastic optical connector.
Figure 7:
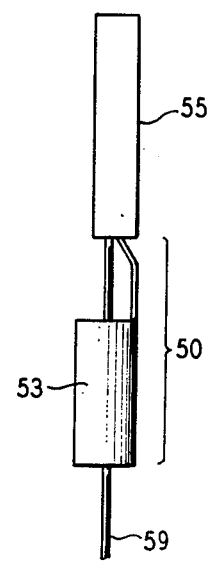
FIG. 7 illustrates the side view of FIG. 6 after forming the tube.

FIG. 6 illustrates the nonhermetic header provided with provisions for fabricating an integral tube. The header 55 of the type described above is formed with a T-shaped extension 50 having ends 51. After inserting the fiber 59 within a plastic tubular mandrel 52, the ends 51 are rolled around the mandrel as shown in FIG. 6 to form a metal tube 53. FIG. 7 depicts a side view of the finished tube and header.

Figure 8:
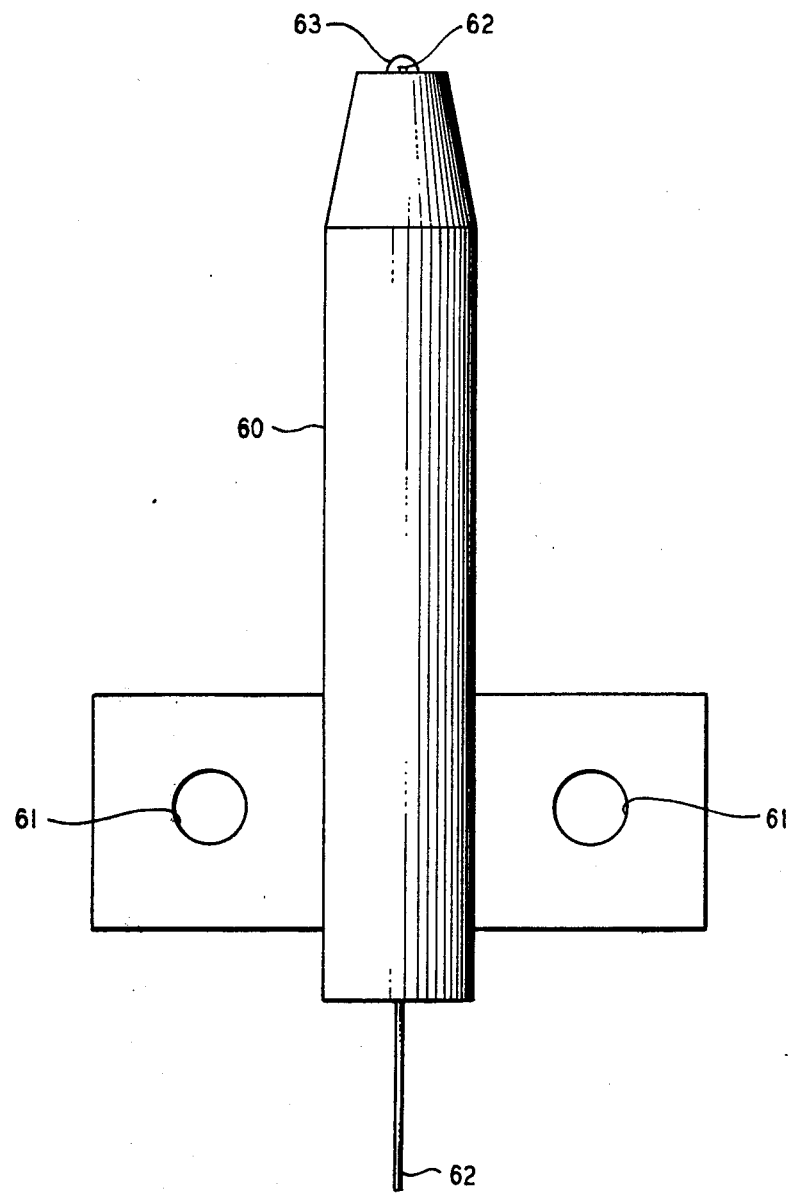
FIG. 8 shows an embodiment of an optical connector containing the header of either FIG. 3 or FIG. 5.

FIG. 8 illustrates an optical connector plug 60 containing either of the above-described headers. The ends of the header containing mounting holes 61 protrude through the connector shell 60, thereby providing convenient mounting means. The optical fiber 62 also protrudes from the connector shell 60. The mating end of the fiber is embedded within a flexible contact dome 63. To provide an optical connection, the flexible dome 63 is compressed against a corresponding dome on a mating connector half (not shown) containing only an optical fiber.

Satisfactory models of the nonhermetic header have been fabricated from copper by a coining process. The process can be used as well for the hermetic header. The copper is then advantageously gold plated to provide a good surface for bonding of the laser. While the header can be manufactured from a choice of ductile metals, it is preferable to use a metal with high thermal conductivity to facilitate the transfer of heat from the semiconductor laser.

While the above descriptions refer to the alignment of a semiconductor laser to an optical fiber, it is to be understood that the present invention is equally applicable for the alignment and coupling of optical fibers to other devices, such as light-emitting diodes and photodiodes.

We claim:

1. Apparatus for coupling an electrooptical device to an optical fiber including a header (10) having a plateau (11) and a trough (12) with a flat bottom (13) disposed adjacent to said plateau and characterized in that the depth (D) of said trough is configured so that when a light emitter (15) is mounted on said plateau and the fiber (19) is fully inserted with a portion of said fiber's circumference in direct contact with the flat bottom of said trough, the center of the light guiding core of said fiber lies in a plane (A-A') of maximum light emission, said plane being parallel to the trough bottom and passing through the point of maximum light emission within the emitting region (22) of said emitter, and the width (W) of said trough being substantially greater than both the width (X) of said emitter and the diameter of said fiber to permit lateral displacement of said fiber.

2. A device for coupling a light receptor to an optical fiber including a header having a plateau and a trough with a flat bottom disposed adjacent to said plateau and characterized in that the depth of said trough is configured so that when a light receptor is mounted on said plateau and the fiber is fully inserted with a portion of said fiber's circumference in direct contact with the flat bottom of said trough, the center of the light guiding core of said fiber lies in a plane (A-A') of maximum light sensitivity, said plane being parallel to the trough bottom and passing through the point of maximum light sensitivity within the receiving region of said receptor, and the width of said trough being substantially greater than both the width of said receptor and the diameter of said fiber to permit lateral displacement of said fiber.

3. The device of claim 1 or 2 characterized in that said header (10) also includes a slot (18) disposed substantially opposite said trough (12), said slot beginning at said plateau (11) and extending to the edge of said header.

4. The device of claim 1 or 2 characterized in that said header (10) also includes a means (16) for mounting said header to other apparatus.

5. The device of claim 1 or 2 characterized in that said header (10) further includes a well portion in which is provided a plateau (31), for mounting an electrooptic device, and a fiber receiving trough (33), with a flat bottom (34), and access to the well portion being provided by holes (41, 40) dimensioned so as to slidingly receive optical and electrical connections respectively.

6. The device of claim 5 characterized in that said header (10) further includes an integral tube (52) extending from said trough (12), said tube being configured to slidingly receive an optical fiber.

7. The device of claim 1 or 2 characterized in that said header (10) further includes an integral tube (52) extending from said trough, (12), said tube being configured to slidingly receive an optical fiber.

* * * * *